Oct. 27, 1925.
F. B. PETTIT ET AL
LICENSE PLATE CARRIER
Filed June 25, 1925
1,559,128
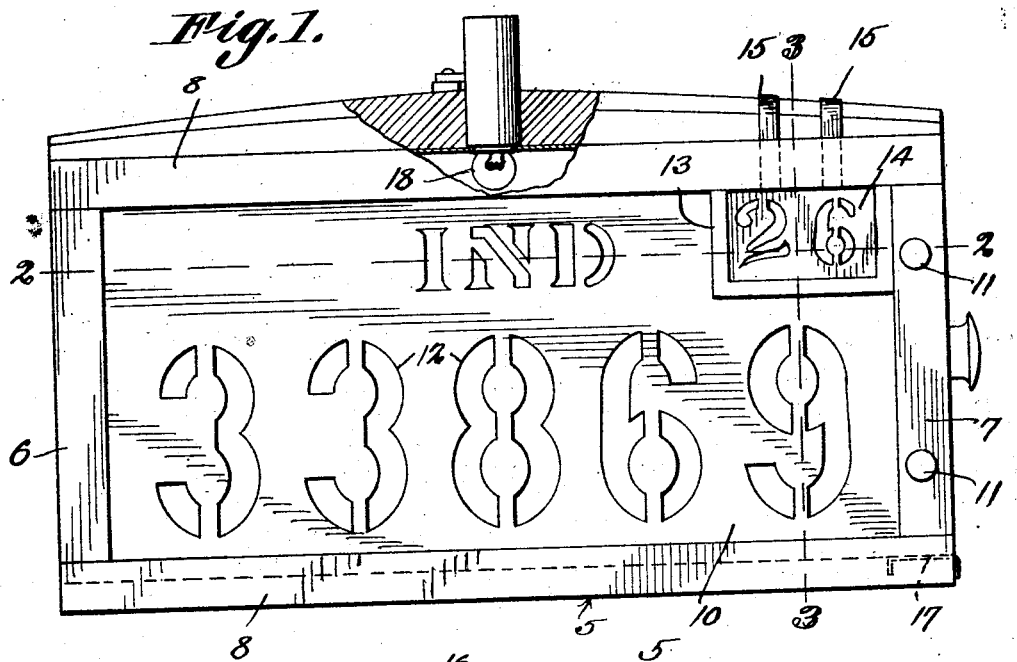
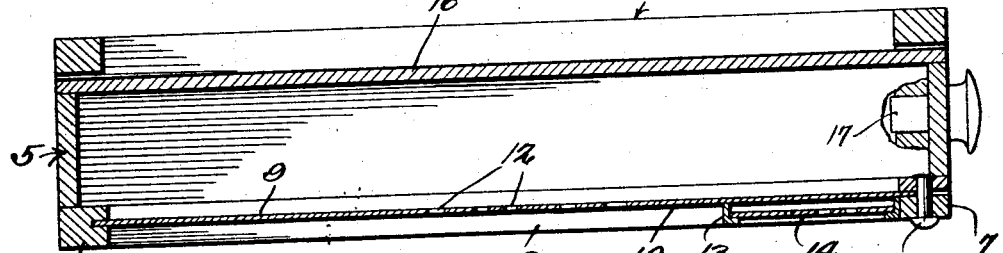
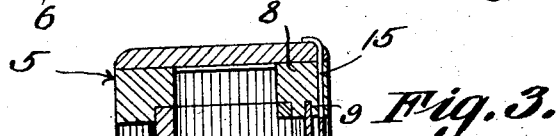
F. B. Pettit
G. H. Knowlton
Inventors
by C. A. Snow & Co.
Attorneys Patented Oct. 27, 1925.

1,559,128

UNITED STATES PATENT OFFICE.

FOSTER B. PETTIT AND GERRY H. KNOWLTON, OF LOGANSPORT, INDIANA.

LICENSE-PLATE CARRIER.

Application filed June 25, 1925. Serial No. 39,562.

*To all whom it may concern:*

Be it known that we, FOSTER B. PETTIT and GERRY H. KNOWLTON, citizens of the United States, residing at Logansport, in the county of Cass and State of Indiana, have invented a new and useful License-Plate Carrier, of which the following is a specification.

This invention relates to license tags for motor vehicles and aims to provide a novel form of tag holder, whereby the tag may be secured in position on the tag holder in a manner to insure against unauthorized persons removing the same speedily without disfiguring the device.

Another important object of the invention is to provide a box-like tag holder, the same being lined with a suitable coating material to indicate danger and at the same time, providing a backing for the numbers and letters of the tag to cause the numbers and letters to be clearly visible in the light as well as in the dark.

A further object of the invention is to provide a box-like supporting member having an inner removable section whereby access to the interior of the box may be had to replace the bulb or remove foreign matter from the interior thereof.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawing:

Figure 1 is a front elevational view of a license tag and holder constructed in accordance with the invention.

Figure 2 is a sectional view taken on line 2—2 of Figure 1.

Figure 3 is a sectional view taken on line 3—3 of Figure 1.

Referring to the drawing in detail, the device includes a box-like body portion 5 that embodies the bars 6 and 7 respectively, disposed at the forward ends thereof and the upper and lower bars 8 which have connection with the bars 6 and 7.

The bar 6 and bars 8 are provided with grooves 9 designed to accommodate the license plate 10 which is of a width to slide within the grooves.

The bar 7 embodies a pair of spaced members between which the plate 10 slides, the spaced members being provided with suitable openings to accommodate the rivets 11 or other locking device that engage one edge of the license plate to hold the same against movement after it has been positioned within the grooves of the several bars forming the forward portion of the license plate holder.

When these rivets have been properly positioned, it is obvious that the license plate 10 may be removed only by distorting the rivets and removing the same thereby rendering it difficult for a person to remove the license plate with the ordinary tools carried in an automobile tool chest. The license plate is provided with a plurality of cut out portions 12 that define numbers to the end that light rays may be projected through the cut out portions outlining the members and making the device clearly visible in the dark.

Supported at one corner of the plate holder is a grooved member 13 which is designed to receive a relatively small plate formed with cut out portions indicating the year in which the license plate was issued. The body portion is formed with a cut out portion directly above the member 13 so that the plate, which in the present showing is indicated at 14 may be positioned therethrough, arms 15 extending upwardly from the plate 14, which arms may be bent over upon the upper edge of the body portion as shown by Figure 3 to hold the plate in position.

The rear wall of the body portion is closed by means of the removable section 16 which has its forward portion and upper portion open to allow light rays to pass therethrough, the rear wall as well as the bottom and end walls thereof, being coated with a prescribed material so that the light rays projected through the openings will be clearly visible in the dark, and at the same time the coating will form a background to render the numbers and letters clearly visible in the daytime.

A suitable spring catch or other locking device indicated at 17 is provided to frictionally engage the bottom wall of the inner section and hold the same against movement after it has been positioned. Thus it will be seen that should it be desired to clean the interior of the license plate holder, the inner section may be removed, allowing a person to have access to the interior of the holder from the open rear thereof.

An electric lamp is indicated at 18 and is of a candle power to adequately illuminate the interior of the license holder, to the end that the numbers and letters of the license plate will be clearly visible at all times.

In view of the foregoing detail description, a further detail description as to the use of the device is believed unnecessary for a complete understanding of the invention.

We claim:—

1. In a device of the character described, a box-like body portion, the front and rear of the body portion being open, said body portion having grooves to receive a license plate, means extending through one of the grooves to lock a license plate within the grooves, and an inner section having a rear wall adapted to normally close the open rear surface of the body portion.

2. In a device of the character described, a box-like body portion, said body portion having its front and rear open, the license plate having cut out portions defining numbers adapted to be positioned to normally close the open front of the body portion, means for illuminating the interior of the body portion to project light rays through the cut out portions, and an inner section having a rear wall adapted to normally close the rear of the body portion.

3. In a device of the character described, a box-like body portion, the front and rear of the body portion being open, a license plate having cut out portions defining numbers adapted to normally close the front of the body portion, means for illuminating the interior of the body portion, and an inner removable section having a rear wall adapted to normally close the rear wall of the body portion.

In testimony that we claim the foregoing as our own, we have hereto affixed our signatures.

FOSTER B. PETTIT.
GERRY H. KNOWLTON.